(12) United States Patent
Wu

(10) Patent No.: US 7,429,281 B2
(45) Date of Patent: Sep. 30, 2008

(54) METHOD FOR MANUFACTURING BIO-DIESEL OIL CONTAINING ALKANE COMPOUNDS

(76) Inventor: Oliver Wu, No. 50, Lungchiang St., Sanmin Dist., Kaohsiung (TW)

( * ) Notice: Subject to any disclaimer, the term of this patent is extended or adjusted under 35 U.S.C. 154(b) by 820 days.

(21) Appl. No.: 10/915,325

(22) Filed: Aug. 11, 2004

(65) Prior Publication Data

US 2005/0039383 A1    Feb. 24, 2005

(30) Foreign Application Priority Data

Aug. 20, 2003    (TW) .............................. 92122828 A

(51) Int. Cl.
*C10L 1/18* (2006.01)
*C10L 1/04* (2006.01)
*C07C 1/00* (2006.01)

(52) U.S. Cl. ..................... 44/308; 44/388; 208/15; 585/733

(58) Field of Classification Search ................ 44/308, 44/388; 208/15; 585/15
See application file for complete search history.

(56) References Cited

U.S. PATENT DOCUMENTS 7,351,324 B2 *    4/2008    Chen ........................... 208/15

\* cited by examiner

*Primary Examiner*—Cephia D Toomer
(74) *Attorney, Agent, or Firm*—Lowe Hauptman Ham & Berner, LLP

(57) ABSTRACT

A method for manufacturing bio-diesel oil in the present invention uses single-carbon alkane compounds to reform into intermediate alkanes to achieve a synthetic alkylation matter. The synthetic alkylation matter is mixed with plant oil or mixed with alkyl fatty acid derivative from fatty acid of the plant oil into a mixture. Additionally, additives such as stabilizer, preservatives, etc. are selectively added to the mixture to obtain low-cost and low-pollution bio-diesel oil

3 Claims, 2 Drawing Sheets

US 7,429,281 B2

METHOD FOR MANUFACTURING BIO-DIESEL OIL CONTAINING ALKANE COMPOUNDS

BACKGROUND OF THE INVENTION

1. Field of the Invention

The present invention relates to a method for manufacturing bio-diesel oil, and more particularly to a method for manufacturing bio-diesel that is achieved by generating primary alkane, reforming the primary alkane into intermediate alkane and selectively mixing the intermediate alkane with fatty alkyl ester or plant oil to produce low polluting diesel fuels.

2. Description of Related Art

"Bio-" is combining word used with a loanword to form a compound word and particularly means "life" as in biological. "Applying bio-material" is to recycle natural materials during the processes of to propagation, growth, maturity and death in life cycles of each animal or plant generation. This concept has become popular because the natural materials used in recycling cause no pollution.

Currently, most diesel fuels are petroleum distillation products. However, estimates assert that the earth's supply of oil will be exhausted in the next forty years. With a preponderance of the earth's oil reserves centered in the politically unstable Persian Gulf region, crude oil availability will diminish in the future, and a new energy source is desperately needed to supplement and alternative petroleum. Furthermore, using conventional diesel fuel produces many pollutants so a clean diesel substitute needs to be developed.

Therefore, bio-diesel made of methyl ester fatty acid that is a plant oil derivative obtained from synthetic fatty acid in plant oil and alcohol has been developed. The only significant byproduct of burning bio-diesel obtained from plant oil is carbon dioxide, which is transformed to oxygen and bio-energy by photosynthesis in plants. Therefore, the total quantity of carbon dioxide in the environment does not increase. Because the bio-diesel containing methyl ester from plant oil is biodegradable and causes no air pollution to environment, the bio-diesel is the most ideal new energy source as a substitute for petroleum.

However, bio-diesel developed in advanced countries still consists mainly of mineral fuel (distillated petroleum) and contains only a small proportion of plant oil. Bio-diesel containing mostly plant oil derivatives causes production cost of the bio-diesel to increase. Therefore, currently available bio-diesel still contains 70-80% mineral fuel to make the bio-diesel practicable and affordable.

Conventional bio-diesel containing mineral fuel also causes air pollution because the mineral fuel obtained from crude oil distillation inevitably contains sulfur and aromatic that emission to toxic gases after burning the bio-diesel. Furthermore, the future shortage of mineral fuel also limits the time that this form of bio-diesel can be used.

To overcome the shortcomings, the present invention provides a method for manufacturing bio-diesel oil containing alkane compounds to mitigate and obviate the aforementioned problems of conventional bio-diesel.

SUMMARY OF THE INVENTION

The main objective of the invention is to provide a method for manufacturing bio-diesel oil containing alkane compounds, which substitutes synthetic alkylation matter for conventional mineral fuel and mixes the synthetic alkylation matter with alkyl fatty ester.

Objectives, advantages and novel features of the invention will become more apparent from the following detailed description when taken in conjunction with the accompanying drawings.

DETAILED DESCRIPTION OF PREFERRED EMBODIMENT

A method for manufacturing bio-diesel oil containing alkane compounds in accordance with the present invention comprises the following acts:

obtaining carbon oxide compounds;

hydro-deoxidizing the carbon oxide compounds to produce single-carbon alkane and a temporarily active free radical of the single-carbon alkane ($-CH_2-$);

reforming the single-carbon alkane and the temporarily active radical of the single-carbon alkane to make synthetic alkylation matter containing $C_3$-$C_{25}$;

obtaining fatty acid;

esterifying the fatty acid with alcohol to alkyl fatty ester;

mixing the synthetic alkylation matter and the alkyl fatty ester; and optionally adding stabilizers, colorants (dye), preservatives, organic metallic compounds and pour point depressants.

Carrying out the foregoing acts produces a bio-diesel oil containing alkane compounds.

Optionally, the synthetic alkylation matter can be mixed with the fatty acid without esterifying.

Figure 1:
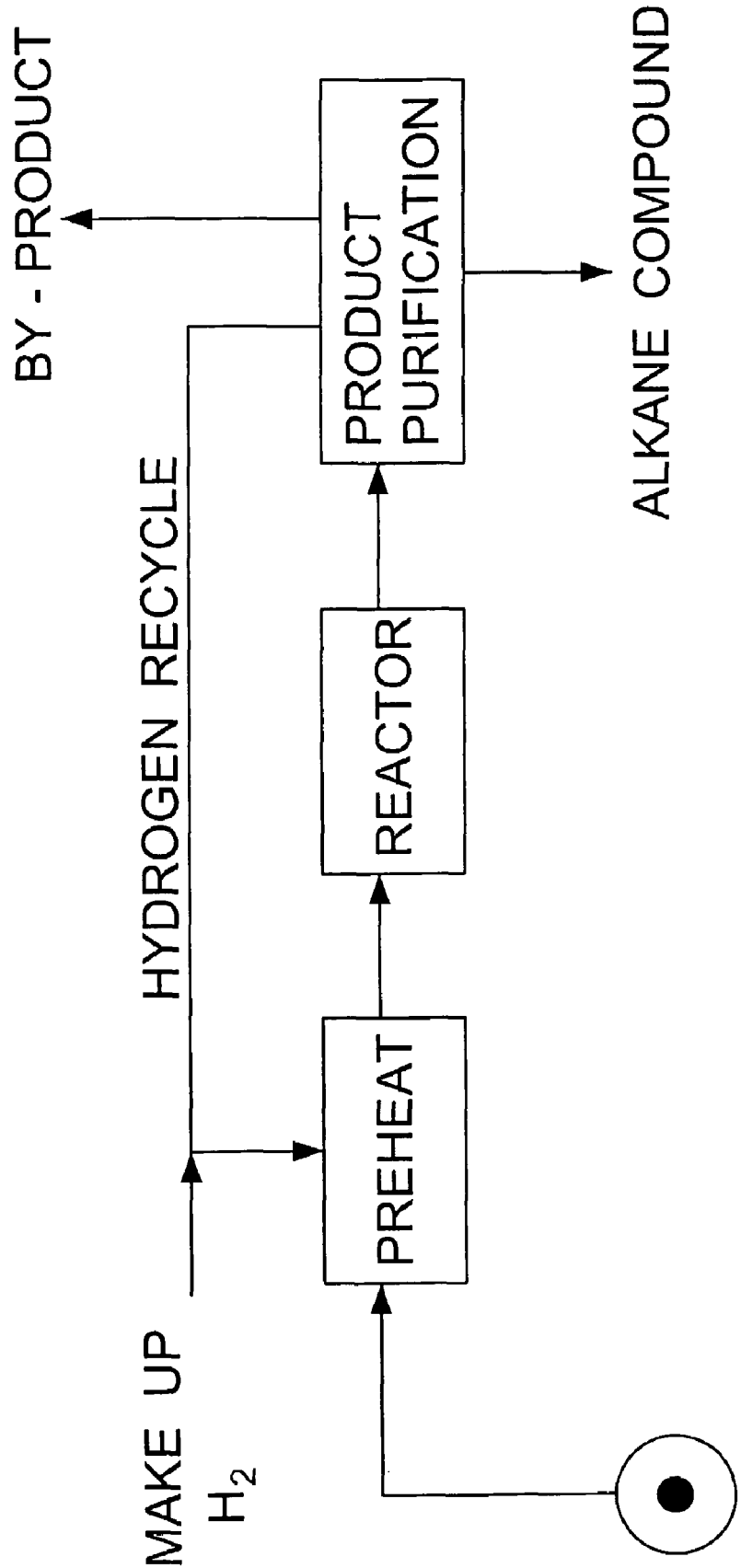
FIG. 1 is an operational flow chart of a hydrodeoxygenation (H.D.O.) process in accordance with the present invention.

With reference to FIG. 1, a carbon oxide compound is the initial raw material and is preferred to be carbon monoxide usually obtained from the gas from pyrolysis straw or from terminal waste gas of a basic oxygen furnace.

The carbon monoxide is preheated and then mixed with hydrogen to become a mixture. The mixture is input to a reactor to undergo hydro-deoxidizing reaction by a catalyst. In the hydro-deoxidizing reaction, the hydrogen molecular is decomposed into hydrogen atoms, each substitutes one oxygen atom on the carbon monoxide. Products of the hydro-deoxidizing reaction are mainly single-carbon alkane and temporarily active free radicals of the single-carbon alkane ($-CH_2-$, methylene), and byproducts of the reaction are steam and oxygen. The single-carbon alkane and the temporarily active free radical of the single-carbon alkane are separated from the byproducts and purified. The catalyst is preferred to be nickel-aluminum oxide and an operational temperature range of the hydro-deoxygenating reaction is 250 to 300° C.

Figure 2:
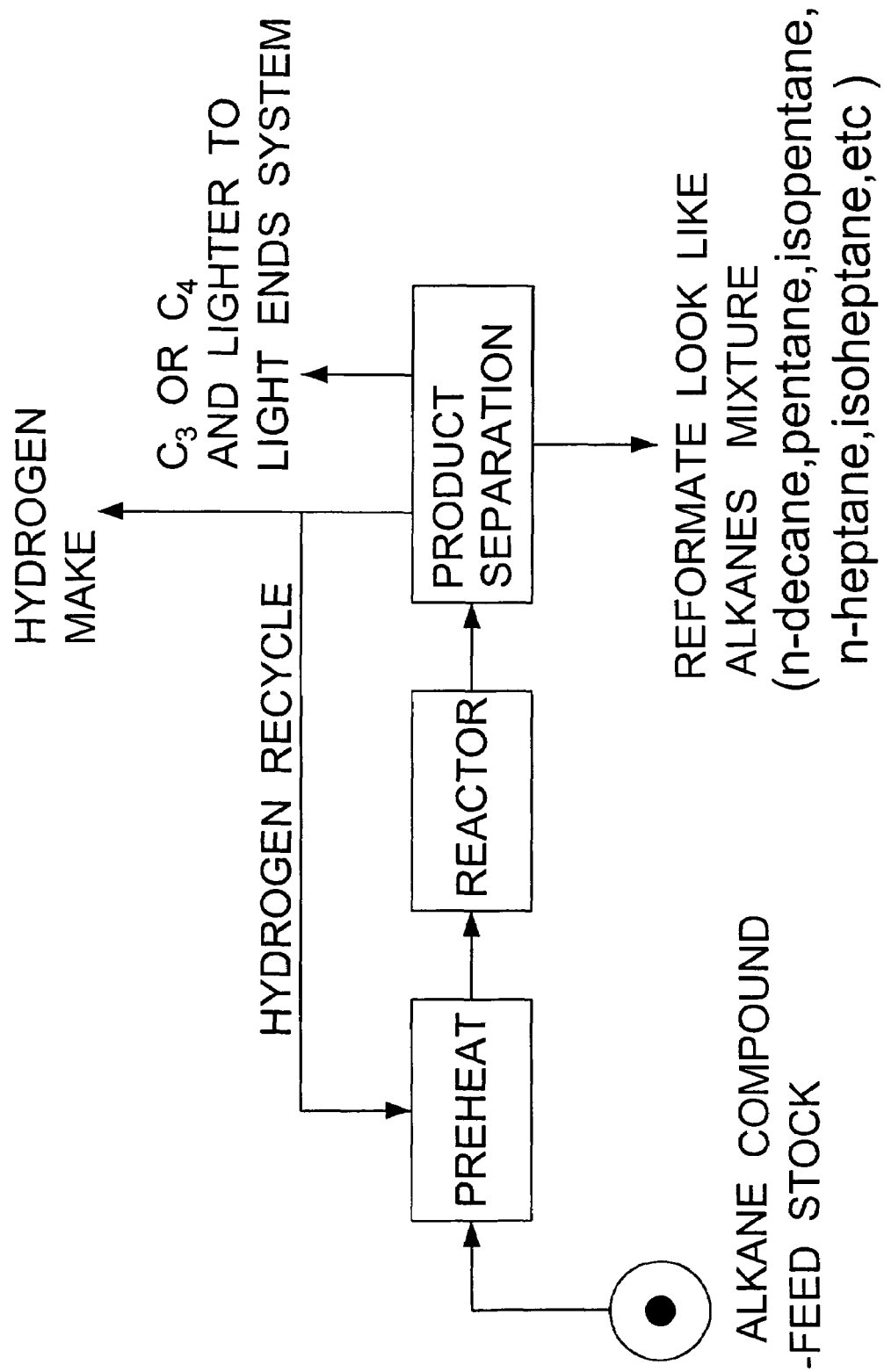
FIG. 2 is an operational flow chart of reformation process in accordance with the present invention.

With reference to FIG. 2, a purified mixture of the single-carbon alkane and the temporarily free radical of the single-carbon alkane is fed into another reactor to form intermediate acyclic hydrocarbon compounds containing $C_3$-$C_{25}$ by controlling operational temperatures and catalysts. The catalyst is preferred to be nickel/titanium dioxide, and has a preheating temperature range of 450~550° C. before adding into the purified mixture. During combustion of the bio-diesel oil, the temperature will raise higher. Final products of the reforming reaction are multiple hydrocarbon compounds having $C_3$-$C_{25}$ carbon chains. Because the reforming reaction cannot precisely control the molecular structure of the intermediate acyclic hydrocarbon compounds, the carbon chains can be normal-chains (linear) or iso-chains (branch) having different numbers of carbon atoms. The number range of the intermediate acyclic hydrocarbon compounds is 3-25, which is preferred to be 5-20 and most preferred to be 13-19 in liquid. Therefore, the synthetic alkylation material mostly contains intermediate acyclic hydrocarbon compounds such as n-decane, pentane, iso-pentane, n-heptane and iso-heptane etc. Byproducts in the reforming reaction are primary alkanes containing $C_3$-$C_4$ and hydrogen in gas. The hydrogen can be reused in the hydro-deoxidizing reaction, and the primary alkane is used as gas fuel. The mixture of the intermediate acyclic hydrocarbon compounds is the synthetic alkylation matter.

The synthetic alkylation matter is further mixed with plant oil or ester derivatives from plant oil to produce the bio-diesel oil in accordance with the present invention.

The plant oil is mixed with alcohol and esterified to alkyl fatty ester, wherein potassium hydroxide is the catalyst in the esterification. One example of the esterification is shown as the following chemical formula:

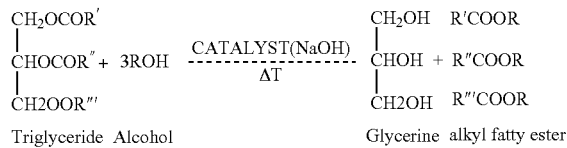

Triglyceride    Alcohol                           Glycerine  alkyl fatty ester

In the foregoing reaction, the alcohol is usually selected from methanol or ethanol so the alkyl fatty ester is methyl fatty ester or ethyl fatty ester. The resultant methyl fatty ester or the ethyl fatty ester can be as bio-diesel, but in that form the bio-diesel has a high product cost. Therefore, the alkyl fatty ester is further mixed with the synthetic alkylation matter to obtain an increased volume of bio-diesel oil containing alkane compounds in accordance with the present invention.

To easily store the bio-diesel oil and give the bio-diesel oil excellent combustion efficiency, selective additives such as stabilizers, colorants, preservatives, organic metallic compounds and pour point depressants are further added to the mixture of alkyl fatty ester and the synthetic alkylation matter. The additives have the following characteristics and are added to the bio-diesel oil in a proper component ratio.

1. Stabilizer:
The stabilizer used in the bio-diesel oil improves the chemical stability, anti-oxidizing efficiency and thermal stability to prevent generating deposits or suspended solid that may block pipes in a manufacturing system. The stabilizer is preferred to be an amine-type or phosphate-type compound rather than a sulfur-type compound containing sulfur that causes air pollution after combustion.

2. Colorant (dye):
The colorant is added to the bio-diesel oil to distinguish different kinds of bio-diesel oil for different purposes. Additionally, the colorant is preferred to be non-sulfur compounds.

3. Preservative:
Because the bio-diesel oil is organic and contains moisture, microorganisms easily propagate in the bio-diesel oil and degrade the alkyl fatty ester that breaks down the bio-diesel oil. Therefore, preservatives such as biocides are added to the bio-diesel oil to suppress the propagation of or kill the microorganisms.

4. Organic metallic compound:
The organic metallic compounds are organic compounds of alkaline-earth metals such as barium, magnesium, calcium and other metal such as sodium etc, and are preferred to be metallic carboxylic acids. The organic metallic compounds turn sulfuric oxides ($SO_x$) and nitrous oxides ($NO_x$) in flue gas to salt (such as $MeSO_x$ or $MeNO_x$) to prevent the sulfuric oxides and the nitrous oxides from respectively becoming sulfuric acid and nitrous acid that cause acid rain below the dew point.

5. Pour point depressant:
The bio-diesel oil has poor fluidity in a low-temperature environment, which influences the efficiency of the bio-diesel oil. Therefore, certain pour point depressants such as alkyl-methacrylate-typed copolymers or graft copolymers are added to the bio-diesel oil to improve cold flow.

Based on the foregoing description, a bio-diesel oil in accordance with the present invention comprises synthetic alkylation matter, plant oil or a fatty ester derivative and selective additives such as stabilizers, colorants, preservatives, organic metallic compounds and pour point depressants.

The bio-diesel oil is usually cataloged into two types, thermal bio-diesel oil and power bio-diesel oil. The thermal bio-diesel oil is formulated for use in boilers, and the power bio-diesel oil is formulated for use in vehicles and diesel engines. The requirements and characteristics of the thermal bio-diesel oil and the power bio-diesel oil are different and the characteristics of the thermal bio-diesel oil and the power bio-diesel oil are implemented by controlling the ratios of the components and additives of the bio-diesel oil.

A. Power Bio-Diesel Oil:
1. Synthetic alkylation matter:
normal range:47~96% (w/w); preferred range:47~94% (w/w); most preferred range:78~94% (w/w).
2. Alkyl fatty ester:
normal range:3~95% (w/w); preferred range:3~50% (w/w); most preferred range:5~50% (w/w).
3. Colorant:
normal range:1~10 ppm; preferred range:1~5 ppm; most preferred range:1~3 ppm.
4. Preservative:
normal range:10~500 ppm; preferred range:10~100 ppm; most preferred range:50~80 ppm.
5. Pour point depressant:
The pour point depressant is added to the bio-diesel oil only when the temperature is −20° C. to −3° C.
Manufacturing process:
a. Mixing 1, 2 and 5 evenly to obtain a mixture A (1+2+5=A) and then heating the mixture A to make components 1, 2 and 5 homogenous.
b. Mixing 3, 4 and mixture A to obtain the thermal bio-diesel oil (3+4+A=product).

B. Thermal Bio-Diesel Oil:
1. Synthetic alkylation matter:
normal range:47~96% (w/w); preferred range:47~94% (w/w); most preferred range:60~94% (w/w).
2. plant oil:
normal range:3~95% (w/w); preferred range:3~50% (w/w); most preferred range:5~50% (w/w).
3. Organic metallic compound:
normal range of the metal concentration: 4~100 ppm; preferred range:15~70 ppm; most preferred range:20~40 ppm.
4. Preservative:
normal range:10~500 ppm; preferred range:10~100 ppm; most preferred range:50~80 ppm.
Manufacturing process are:
a. Mixing 1 and 2 evenly to obtain a mixture A' (1+2=A').
b. Mixing 3, 4 and mixture A' to obtain the power bio-diesel oil (3+4+A'=product).

Test Experiment

To improve the efficiency of the power bio-diesel oil, the power bio-diesel oil is used in an engine power test (I) and an exhaust contamination test (II).

(I) Engine power test:

Three types of bio-diesel oils in accordance with the present invention (coded in BD9505, BD8020 and BD5050), a pure bio-diesel oil (B100), and a marketed mineral diesel are comparatively tested in a Cummins B5.9 engine. Compositions of the four types of bio-diesel oil are listed in Table 1.

TABLE 1

| Component | BD9505 | BD8020 | BD5050 | B100 |
|---|---|---|---|---|
| Methyl fatty ester | 5.56% | 21.86% | 52.81% | 100% |
| Synthetic alkylation matter | 94.19% | 77.89% | 46.94% | — |
| Others | 0.25% | 0.25% | 0.25% | — |

The conventional mineral diesel was put into a Cummins B5.9 engine to map power. The rotating range in each stage was incremented by 8-10 revolutions per minute (rpm), and the engine was sequentially run at slow rotation to maximum rotation to test power and oil consumption at each stage. Using conventional mineral diesel oil, the engine had a maximum horsepower output of 113.0 Kw and maximum torque of 517 Nm. Using the bio-diesel oils BD9505, BD8020, BD5050 and B100, the maximum horsepower outputs were respectively 104.2 Kw, 104.7 Kw, 104.9 Kw and 102.7 Kw and the maximum torque were respectively 481 Nm, 482 Nm, 487 Nm and 482 Nm. The experimental results are listed in Table 2. The engine using bio-diesel oils decreased respectively 7.8%, 7.3%, 7.2%, 9.1% in the maximum horsepower and 5.8~7.0% in the maximum torque. For all stages in the power mapping, the average horsepower and average torque of the engine using bio-diesel decreased respectively 7.3~8.4% and 7.2~8.0%.

To quantitatively compare the oil consumption between the bio-diesel oils and the mineral diesel oil, the oil consumption was translated into a brake specific fuel consumption (BSFC) for analysis (as shown in Table 2). The engine using mineral diesel oil had a BSFC of 212.7 g/bhp·hr and the engine using bio-diesel oils had BSFCs of 212.8, 219.0, 225.9, 244.5 g/bhp-hr. Therefore, the oil consumption of the engine using bio-diesel oils increased by a maximum of 15%. If the oil consumption is translated into BSFC of volume (BSFC, Vol), the engine using mineral diesel oil had a BSFC, Vol. of 255.2.7 Lr/bhp·hr, and the engine using bio-diesel oils had BSFCs, vol of 269.2, 272.6, 269.1, 279.5.5 Lr/bhp·hr. Therefore, the oil consumption in BSFC, Vol of the engine using bio-diesel increased 5.5~9.5%.

Exhaust Contamination Testing:

The engines used the mineral diesel oil and the bio-diesel oils were estimated to determine integrated power for 1200 seconds in temporarily recycling testing (US-HDD). The integrated power was 9.90075 Kw-hr for mineral diesel oil and 8.98792 (BD9505), 8.98792(BD8020), 9.12836 (BD5050), and 9.05813(B100) Kw-hr for bio-diesel oils as shown in Table 3.

TABLE 3

| | US-HDD temporarily recycling test | | | | |
|---|---|---|---|---|---|
| | Diesel | BD9505 | BD8020 | BD5050 | B100 |
| Integrated power, Kw · hr | 9.90075 | 8.98792 | 8.98792 | 9.12836 | 9.05813 |
| Variation in percentage | — | −9.2% | −9.2% | −7.8% | −8.5% |
| Oil consumption, g/bhp · hr | 243.86 | 252.88 | 260.89 | 269.35 | 293.72 |
| Variation in percentage | — | 3.7% | 7.0% | 10.5% | 20.4% |

The power of the engine using the bio-diesel oils decreased by about 7.8~9.2%, which was similar to the foregoing experiment in different stages. The oil consumption in weight (g/bhp·hr) of the engine using bio-diesel oils increased 3.7~20.4% in comparison with the oil consumption of the engine using mineral diesel oil. Oil consumption of bio-diesel oils increased with the proportion of the ester derivatives (methyl fatty ester) in a positive ratio.

With regard to the exhaust contamination, the engine using mineral diesel oil had the following contaminating indexes of hydrocarbon compounds (THC): 0.435 g/bhp-hr; carbon

TABLE 2

| | Cummins B 5.9, Power Mapping Results | | | | |
|---|---|---|---|---|---|
| | Mineral Diesel | BD9505 | BD8020 | BD5050 | B100 |
| Maximum horsepower output, (Kw) | 113.0 | 104.2 | 104.7 | 104.9 | 102.7 |
| Variation in percentage | — | −7.8% | −7.30% | −7.2% | −9.1% |
| Maximum torque output, (Nm) | 517 | 481 | 482 | 487 | 482 |
| Variation in percentage | — | −7.0% | −6.8% | −5.8% | −6.8% |
| Average horsepower output, (Kw) | 106.1 | 97.7 | 97.9 | 98.4 | 97.2 |
| Variation in percentage | — | −7.3% | −8.0% | −7.3% | −8.4% |
| Average torque output, (Nm) | 447.3 | 411.5 | 413.9 | 415.3 | 412.2 |
| Variation in percentage | — | −8.0% | −7.5% | −7.2% | −7.9% |
| Oil consumption, BSFC, Vol, (Lr/bhp · hr) | 255.2 | 269.2 | 272.6 | 269.1 | 279.5 |
| Variation in percentage | — | 5.5% | 6.8% | 5.4% | 9.5% |
| Oil consumption, BSFC, (g/bhp · hr) | 212.7 | 212.8 | 219.0 | 225.9 | 244.5 |
| Variation in percentage | — | 0.1% | 3.0% | 6.2% | 15.0% | monoxide (CO): 2.055 g/bhp-hr; nitrous oxide ($NO_x$): 6.304 g/bhp-hr; particle matter (PM):0.1324 g/bhp-hr (as shown in Table 4). The engine using BD9505 bio-diesel oils had the following contaminating indexes of hydrocarbon compounds (THC): 0.309 g/bhp-hr; carbon monoxide (CO): 1.530 g/bhp-hr; nitrous oxide ($NO_x$): 5.743 g/bhp-hr; particle matter (PM): 0.0993 g/bhp-hr. Furthermore, the contaminating indexes of other bio-diesel oils were also reduced in comparison with those of the mineral diesel oil.

TABLE 4 contaminating indexes in a temporarily recycling test(US-HDD)

| | Diesel | BD9505 | BD8020 | BD5050 | B100 |
|---|---|---|---|---|---|
| THC, g/bhp · hr | 0.435 | 0.309 | 0.355 | 0.317 | 0.274 |
| Variation in percentage | — | −29.0% | −18.4% | −27.1% | −37.0% |
| CO, g/bhp · hr | 2.055 | 1.530 | 1.640 | 1.642 | 1.822 |
| Variation in percentage | — | −25.5% | −20.2% | −20.1% | −11.3% |
| CO2, g/bhp · hr | 654.7 | 760.4 | 767.3 | 769.2 | 802.1 |
| Variation in percentage | — | 16.1% | 17.2% | 17.5% | 22.5% |
| Nox, g/bhp · hr | 6.304 | 5.743 | 5.777 | 6.012 | 6.56 |
| Variation in percentage | — | −8.9% | −8.4% | −4.6% | 4.1% |
| PM, g/bhp · hr | 0.1324 | 0.0993 | 0.1036 | 0.0997 | 0.0857 |
| Variation in percentage | — | −25.0% | −21.8% | −24.7% | −35.3% |

By using the bio-diesel oils, the contaminating indexes of THC and CO decreased respectively 18.4~37.0% and 11.3~25.5%. None of the bio-diesel oils had any negative growth in $NO_x$ pollutant except B-100. Moreover, the most harmful pollutant, which is the PM that easily cause mutations in the human body, was significantly decreased by 21.8~35.3%. Therefore, using bio-diesel oils efficiently reduced the contaminants in the exhaust.

(II) Thermal efficiency test:

The mineral diesel oil and the bio-diesel oil were tested to estimate thermal efficiency by knowing the oil consumption based on generating same quantity of vapor. Additionally, contaminants in the exhaust were also detected. All experiment data are listed in Table 5 and Table 6.

TABLE 5

| Item | Units | Mineral diesel | Bio-diesel oil | standard | notes |
|---|---|---|---|---|---|
| Fuel | L/Hr | 80 | 76.8 | | |
| PM | % | 92 | 31 | 500 | −66.30 |
| PM Exhaust | mg/nm³ | 0.0523 | 0.0178 | | |

TABLE 5-continued

| Item | Units | Mineral diesel | Bio-diesel oil | standard | notes |
|---|---|---|---|---|---|
| Humidity | % | 9.98 | 9.92 | | |
| Temp. | ° C. | 207 | 217 | | |
| Speed | m/s | 5.86 | 6.15 | | |
| Flow rate | Nm3/min | 15.96 | 16.51 | | Dry test |
| Flow rate | Nm3/min | 17.73 | 18.33 | | Wet test |
| Flow rate | Nm3/min | 9.47 | 9.58 | | Dry adjustment |

The bio-diesel oil used in this thermal efficiency test did not contain organic metallic compounds. In Table 5, the oil consumption of the bio-diesel used 3.2 liters per hour more in comparison with the mineral diesel oil, but did not have any

TABLE 4

| Items | Units | Mineral diesel oil | Bio-diesel oil | Standard | Note | Variation(%) |
|---|---|---|---|---|---|---|
| Fuel | L/Hr | 80 | 76.8 | | | −4.00 |
| Sulfur | % | 0.034 | 0 | | | −100 |
| CO | ppm | 347 | 257 | 2000 | | −25.94 |
| SO2 | ppm | 19 | 0 | 300 | | −100 |
| Nox | ppm | 80 | 95 | 250 | | 18.75 |
| THC | ppm | 76 | 70 | 150 | | −7.89 |
| CO | kg/hr | 0.248 | 0.1833 | | | |
| SO2 | kg/hr | 0.0311 | 0.0082 | | | |
| Nox | kg/hr | 0.0938 | 0.1111 | | | |
| THC Exhaust | kg/hr | 0.031 | 0.0285 | | | |
| Humidity | % | 9.89 | 9.86 | | | |
| Temp. | ° C. | 206 | 219 | | | |
| Speed | m/s | 5.88 | 6.12 | | | |
| Flow rate | Nm3/min | 17.84 | 16.39 | | Dry test | |
| Flow rate | Nm3/min | 16.07 | 18.19 | | Wet test | |
| Flow rate | Nm3/min | 9.53 | 9.51 | | Dry adjustment | | sulfur and sulfur oxides, and the THC also decreased. However, the nitrous oxides increased because no organic metallic compounds were added to the bio-diesel oil. The organic metallic compounds convert the nitrous oxides to ash that is removable from the exhaust. Additionally, the particle matter (PM) in the exhaust of the bio-diesel was also greatly decreased.

Based on the foregoing experiments and descriptions, the bio-diesel oils in the present invention has following advantages:

1. Although the bio-diesel oils containing alkane compounds in the present invention have lower thermal efficiency, high viscosity and high flowing points, the bio-diesel oils contains no sulfur or aromatic hydrocarbon and has excellent lubricant efficiency.

2. The bio-diesel oils decrease multiple contaminating indexes such as CO, THC, PM, and $NO_x$ to cause less pollution than the conventional mineral diesel oil.

Even though numerous advantages of the present invention have been set forth in the foregoing description, the disclosure is illustrative only. Changes may be made in detail within the principles of the invention to the full extent indicated by the broad general meaning of the terms in which the appended claims are expressed.

What is claimed is:

1. A method for manufacturing bio-diesel oils containing alkane compounds comprising the following acts:
    obtaining carbon oxide compounds;
    hydro-deoxidizing the carbon oxide compounds to produce single-carbon alkane and a temporarily active free radical (—$CH_2$—) of the single-carbon alkane;
    reforming the single-carbon alkane and the temporarily active radical of the single-carbon alkane to make a synthetic alkylation matter containing $C_3$-$C_{25}$; and
    mixing the synthetic alkylation matter with plant oils.

2. The method as claimed in claim 1, wherein the acts further comprises selectively adding additives selected from the group comprising: stabilizers, colorants, preservatives, organic metallic compounds and pour point depressants.

3. The method as claimed in claim 2, wherein the organic metallic compounds are organic alkaline-earth metal compounds.

* * * * *